(12) United States Patent
Souissi (10) Patent No.: US 6,785,556 B2
(45) Date of Patent: Aug. 31, 2004

(54) METHOD AND APPARATUS FOR A SOFTWARE CONFIGURABLE WIRELESS MODEM ADAPTABLE FOR MULTIPLE MODES OF OPERATION

(75) Inventor: Slim Salah Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 442 days.

(21) Appl. No.: 09/925,565

(22) Filed: Aug. 8, 2001

(65) Prior Publication Data

US 2002/0068608 A1 Jun. 6, 2002

Related U.S. Application Data

(60) Provisional application No. 60/224,727, filed on Aug. 11, 2000, and provisional application No. 60/227,723, filed on Aug. 24, 2000.

(51) Int. Cl.[7] .......................... H04Q 7/20; H03K 5/159; H04M 1/00
(52) U.S. Cl. ................... 455/557; 455/418; 455/419; 455/420; 455/522.1; 375/222; 375/235; 379/93.29; 718/178
(58) Field of Search .................... 455/418, 414, 455/419, 420, 422.1–426.2, 456.1, 462, 9, 11.1, 41.2, 73, 90.1, 78, 88, 550.1, 552.1, 556.1, 556.2, 557, 561, 575.1, 95; 375/222, 259, 295, 235; 342/385, 357, 457; 709/229; 713/2; 379/58.17, 201, 23.05, 93.29; 370/338, 401, 333, 343; 717/178

(56) References Cited

U.S. PATENT DOCUMENTS

| | | | |
|---|---|---|---|
| 5,367,563 A | * 11/1994 | Sainton | .................... 455/418 |
| 5,581,261 A | 12/1996 | Hickman et al. | |
| 5,612,991 A | 3/1997 | Nair et al. | |
| 5,619,531 A | 4/1997 | Taylor et al. | |
| 5,854,985 A | 12/1998 | Sainton et al. | |
| 5,862,491 A | 1/1999 | Nair et al. | |
| 5,940,438 A | 8/1999 | Poon et al. | |
| 5,950,130 A | 9/1999 | Coursey | |
| 5,995,567 A | * 11/1999 | Cioffi et al. | ................. 375/346 |
| 6,034,623 A | * 3/2000 | Wandel | ................. 379/106.01 |
| 6,052,600 A | 4/2000 | Fette et al. | |
| 6,085,098 A | 7/2000 | Moon et al. | |
| 6,128,489 A | 10/2000 | Seazholtz et al. | |
| 6,138,009 A | 10/2000 | Birgerson | |
| 6,148,197 A | 11/2000 | Bridges et al. | |
| 6,192,070 B1 | 2/2001 | Poon et al. | |
| 6,480,507 B1 | * 11/2002 | Mercer et al. | ............... 370/469 |
| 6,567,649 B2 | * 5/2003 | Souissi | ........................ 455/83 |
| 6,625,472 B1 | * 9/2003 | Farazmandnia et al. | ..... 455/557 |
| 2002/0083432 A1 | * 6/2002 | Souissi et al. | .............. 717/178 |
| 2002/0110189 A1 | * 8/2002 | Souissi et al. | .............. 375/235 |

* cited by examiner

Primary Examiner—Erika Gary
Assistant Examiner—Kamran Afshar
(74) Attorney, Agent, or Firm—Coudert Brothers LLP (57) ABSTRACT

The present invention provides for a software configurable wireless modem that can be configured using software downloaded by a host computer. The user can select a preferred mode of operation, or mode selection can be done automatically based upon whether one or more predetermined criterion, such as a location of the modem, are met.

39 Claims, 8 Drawing Sheets

METHOD AND APPARATUS FOR A SOFTWARE CONFIGURABLE WIRELESS MODEM ADAPTABLE FOR MULTIPLE MODES OF OPERATION

This application claims the benefit of U.S. Provisional Application No. 60/224,727 filed Aug. 11, 2000 and U.S. Provisional Application No. 60/227,723 filed Aug. 24, 2000.

FIELD OF THE INVENTION

The present invention is directed to wireless radio frequency modems and, more specifically, to detachable wireless radio frequency modems that can be configured for multiple modes of operation using software downloaded by a host computing device.

BACKGROUND OF THE INVENTION

Current wireless radio frequency ("RF") modems that cooperatively operate with a host computing device ("host computer") typically include: (1) a radio portion, also called an RF front end or an RF head; (2) a modulator/demodulator portion, also called a baseband processing unit or baseband chip; (3) a central processing unit ("CPU") or processor; (4) a memory; and (5) an interface. During a receive mode of a wireless communication process, these modem components collectively to receive an electromagnetic RF signal, wherein the received RF signal contains information to be extracted. In a transmit mode, the components work collectively to transmit an electromagnetic RF signal, wherein the RF signal contains the information to be transmitted.

During the wireless communications process, the modem components collectively operate to perform three principal modem functions: RF conversion, baseband processing and protocol stack control. During the receive mode, RF conversion is the preparation of the RF signal received at the antenna for demodulation and, during the transmit mode RF conversion is the preparation of the modulated baseband analog signal for transmission. During the receive mode, baseband processing is the demodulation of the modulated baseband analog signal to extract a plurality of data bits that correspond to the information being received, and during the transmit mode it is the generation of the modulated baseband analog signal from a plurality of data bits.

As part of the above wireless communications process, data bits being transmitted are wrapped with protocol bits of data to facilitate transmission, routing, and receiving of the data bits. Likewise, this protocol data must be removed to accurately reproduce, in the receiving RF modem, the data that was sent. The adding or stripping of the protocol bits, also called protocol stack control, is generally performed by the processor in the RF modem under the control of a protocol stack software program stored in the RF modem's memory. Finally, the interface feeds the data bits from the host computer to the RF modem for processing and transmission and feeds to the host computer the reproduced data bits that were extracted from the RF signal.

The host computer may typically be a laptop or palmtop computer, a Personnel Digital Assistant (PDA), a point of sale terminal, or some other computing system. Typical interfaces between the wireless RF modem and the host computer are RS-232, USB, Parallel Port, IrDa, PCMCIA, or Compact Flash. However, other interfaces are also used, including a variety of proprietary interfaces. Moreover, there are many wireless RF standards that must be considered in the design of any wireless RF modem. Some examples include: circuit switched commercial telecommunications standards including AMPS, CDMA (IS95A & B), and GSM; packet switched standards including CDPD, 1XRTT, GPRS, EDGE, and W-CDMA; and proprietary wide area wireless networks such as Metricom, Re-Flex, FLEX, Mobitex, and ARDIS.

Typically, detachable wireless modems are single mode and can operate according to only one of the above telecommunications standards. However, the trend is toward more flexible wireless modems that are capable of operating according to multiple modes, i.e., multiple telecommunications standards. Prior art multi-mode modems are limited, however, in that they do not take advantage of the attached host computer in configuring the modem to operate under multiple standards. Most prior art multi-mode modems achieve the different modes of operation through additional hardware in the modem. Moreover, although some modems have components that are programmable, the modem typically self-configures using software stored in the modem's memory.

What is needed is a detachable wireless RF modem that is constructed to be configured for different modes of operation with minimal need for additional hardware, resulting in a lower cost multi-mode modem. What is also needed is a modem that uses its host computer for reconfiguration and eliminates the need for additional memory to store relevant reconfiguration software, again reducing the cost of the multi-mode modems.

SUMMARY OF THE INVENTION

The present invention is directed at addressing the above-mentioned shortcomings, disadvantages, and problems of the prior art.

Broadly stated, the present invention comprises a detachable software configurable wireless radio frequency ("RF") modem that facilitates wireless data communications according to a plurality of modes of operation. The RF modem is constructed to plug into a host computing device having a storage unit and a central processing unit ("CPU"), said host computing device operative to download software into said RF modem in response to a trigger signal generated by said RF modem, to enable said RF modem to change from a present mode of operation to a selected alternate mode of operation. The RF modem according to the present invention includes an antenna for receiving or transmitting an electromagnetic RF signal, a software configurable RF front end coupled to said antenna for performing RF conversion, a software configurable baseband processor coupled to said RF front end for performing baseband processing, a software configurable modem CPU coupled to said baseband processor and said RF front end for performing protocol stack control and for facilitating said RF modem mode change, and a modem reconfiguration trigger for detecting that at least one predetermined criterion has been met and for generating said trigger signal in response thereto that identifies said selected alternative mode of RF modem operation. The modem CPU operates in response to said downloaded software to reconfigure said RF front end, said baseband processor and said modem CPU so as to cause said RF modem to operate according to said selected alternative mode of operation.

In an alternate embodiment of the present invention, the RF modem further comprising a geographic positioning device coupled to said modem CPU for determining the geographic location of said RF modem.

The present invention also comprises a method for generating a mode change in a detachable and software configurable wireless radio frequency ("RF") modem from a present mode of operation to a selected alternate mode of operation. The method comprises the steps of: detecting whether at least one predetermined criterion has been met; scanning a predetermined plurality of RF modem modes of operation to determine one or more modes of operation that satisfy said at least one predetermined criterion; selecting a mode of operation from said one or more modes of operation determined in the previous step; generating said trigger signal to identify to said host computing device the identity of the mode of operation selected in the previous step; and configuring said RF modem using the software downloaded from said host computing device to cause said RF modem to operate according to said mode of operation selected by the method.

BRIEF DESCRIPTION OF THE DRAWINGS

The forgoing aspects and the attendant advantages of this invention will become more readily apparent by reference to the following detailed description, when taken in conjunction with the accompanying drawings, wherein.

DETAILED DESCRIPTION OF THE INVENTION

Figure 1:
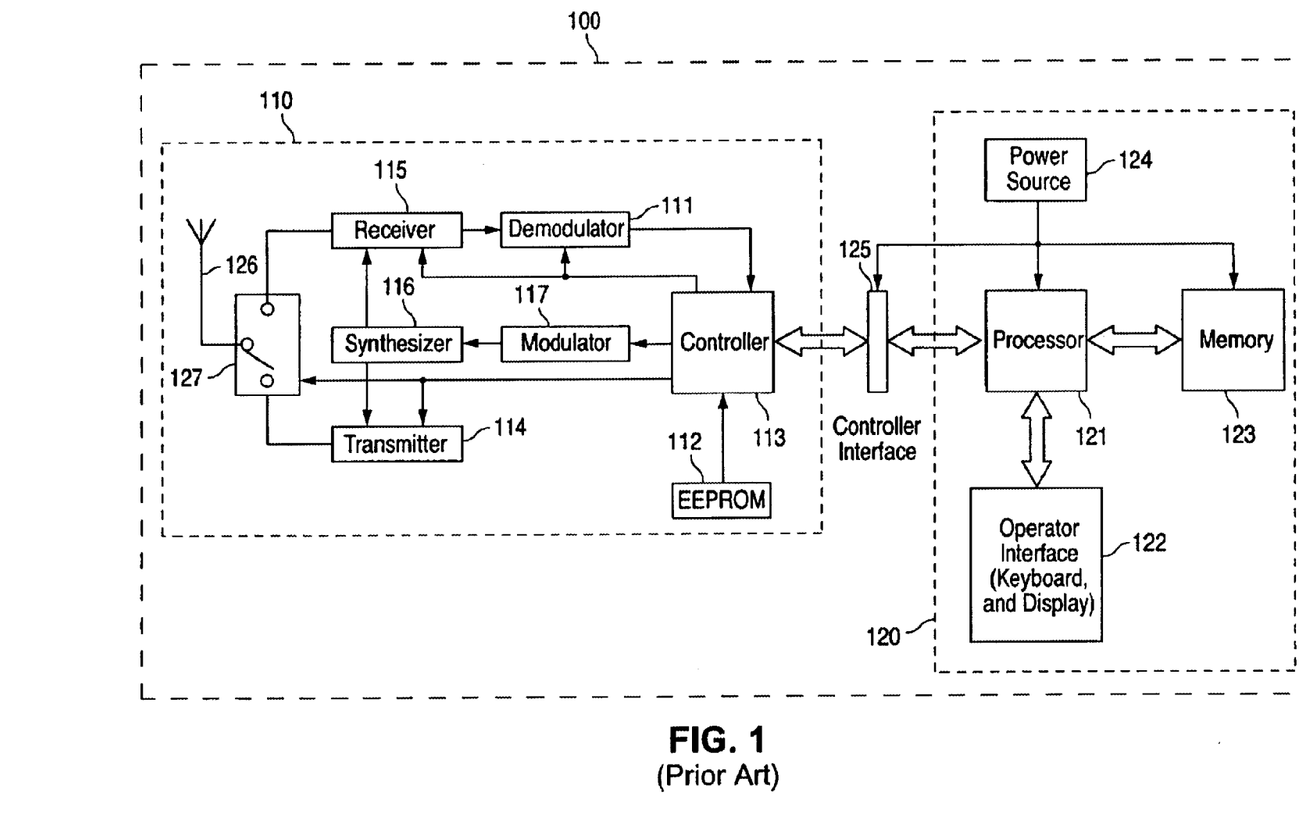
FIG. 1 is a schematic illustration of a prior art system 100 for wireless data communications comprising a wireless RF modem that is connected to a host computer.

FIG. 1 is a schematic illustration of a prior art system 100 for wireless data communications comprising a wireless radio frequency ("RF") modem 110 that is connected at Controller Interface 125 to a host computer 120. RF modem 110 is constructed to function according to a single mode of operation, i.e., according to a single telecommunications standard.

RF modem 110 comprises an Antenna 126, an RF head for RF conversion, a baseband processor for baseband processing, a Controller 113 that is a central processing unit ("CPU") for modem 110 for performing protocol stack control, and an EEPROM 112, wherein a protocol stack software program is stored. The RF head includes an RF Switch 127, a Receiver 115, a Synthesizer 116 and a Transmitter 114, and the baseband processor includes a Demodulator 111 and a Modulator 117. Host computer 120 includes a Power Source 124, a Processor 121 that is the CPU, a Memory 123 and an Operator Interface 122.

The components of RF modem 110 are interconnected as shown by the solid lines with arrows between those components, wherein the direction of the arrows indicate the flow of data during the wireless data communications process. The components of host computer 120 are interconnected as shown by the solid lines with arrows between those components, wherein the direction of the arrows indicate the flow of data during the wireless data communications process. Moreover, there are also double arrows connecting some of the components of host computer 120, i.e., connecting Processor 121 with Memory 123 and connecting Processor 121 with Operator Interface 122. These double arrows indicate that data flows in both directions, during the wireless data communications process, between the connected components.

Controller Interface 125 can be any standard interface that enables RF modem 110 to be dimensioned to connect to a host computing device. It can be dimensioned, for example, to fit within a cradle for a PDA host computer or to enable modem 110 to be dimensioned to correspond to a PCMCIA personal computer card, i.e., for a laptop computer. EEPROM 112 provides for program storage and variable storage for Controller 113, e.g., storing the protocol stack software program.

Figure 2A:
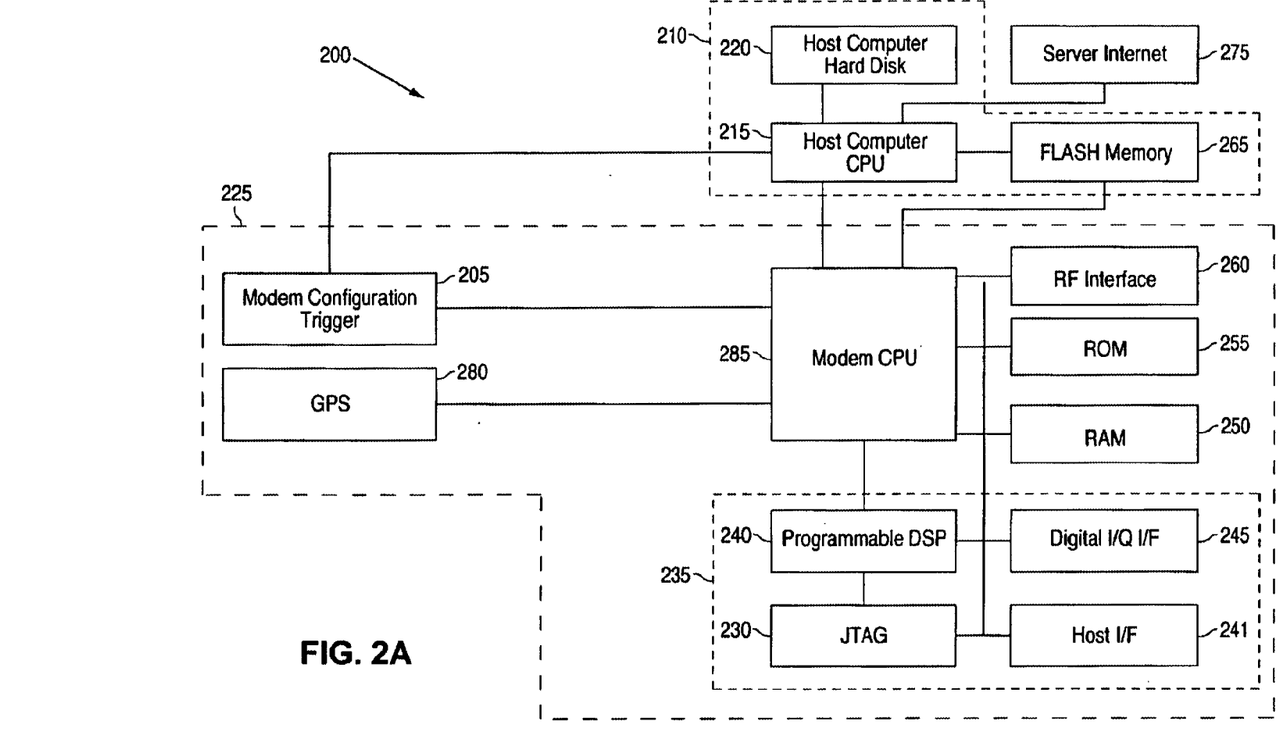
FIG. 2A shows a schematic illustration of a system according to a preferred embodiment of the present invention comprising an RF modem that is adaptable to operate under a plurality of modes of operation and that plugs into a host computer.

FIG. 2A shows a schematic illustration of a system 200 according to a preferred embodiment of the present invention. System 200 comprises an RF modem 225 that is adaptable to operate under a plurality of modes of operation and that plugs into host computer 210. When functioning according to a selected mode of operation, system 200 achieves the same functionality as system 100 illustrated in FIG. 1. However, the significant difference between system 100 and system 200 is that modem 225 of system 200 is software configurable and can function according to a plurality of modes of operation, and selection of a given mode of operation can be done manually by a user of system 200, or it can occur automatically based upon whether at least one predetermined criterion has been met, as discussed more fully below.

Modem 225 comprises: software configurable RF Interface 260, which functions as the RF head for RF conversion; baseband processor 235, which includes software configurable digital signal processor ("DSP") 240, JTAG 230, Digital I/Q I/F and Host I/F for baseband processing; software configurable Modem CPU 285, which is preferably an ARM 7 processor and is used to run the protocol stack software; Modem Configuration Trigger 205, which generates a trigger signal when the mode of operation of Modem 225 is to be changed, such as when at least one predetermined criterion has been met; GPS 280, which is a positioning device used to provide an accurate geographic location of modem 225 and which may be used as part of the mode changing process; RAM 250, which is used by baseband processor 235 and Modem CPU 285 as a working space; and ROM 255, which is used to store fixed variables, tables, and other data, that can be used by baseband processor 235 and Modem CPU 285. Modem 235 is connected by an interface, not shown, to host computer 210. Host Computer 210 comprises a Computer CPU 215, a Computer Hard Disk 220, and a Flash Memory 265. Host Computer 210 can be, for example, a PDA or a laptop computer. Host Computer 210 is preferably coupled to Server Internet 275.

The components of system 200 are connected as indicated by the lines between those components. The interface that connects modem 225 to the host computer, although not shown in FIG. 2A, can be any standard interface that enables RF modem 225 to be dimensioned to fit within a cradle for a PDA host computer or to enable modem 225 to be dimensioned to correspond to a PCMCIA personal computer card, i.e. for a laptop host computer, or the like.

Figure 2B:
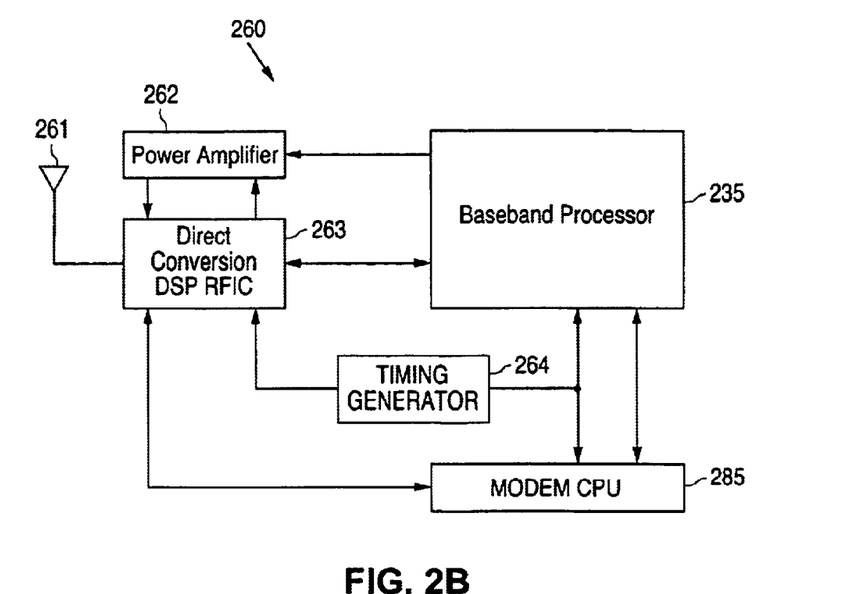
FIG. 2B is a schematic illustration of a preferred implementation of the RF Interface of FIG. 2A, and how the components of the RF Interface are interconnected to the Modem CPU and to the baseband processor.

FIG. 2B is a schematic illustration of a preferred implementation of the RF Interface 260 shown in FIG. 2A, and how the components therein are interconnected to Modem CPU 285 and baseband processor 235. RF Interface 260 preferably comprises: an Antenna 261; a Direct Conversion DSP radio frequency integrated circuit ("RFIC") 263 coupled to Antenna 261, baseband processor 235, and modem CPU 285; a Power Amplifier 262 coupled to Direct Conversion DSP RFIC 263 and baseband processor 235; and a Timing Generator 264 to supply a clock for Direct Conversion DSP RFIC 263, baseband processor 235 and Modem CPU 285.

Figure 3:
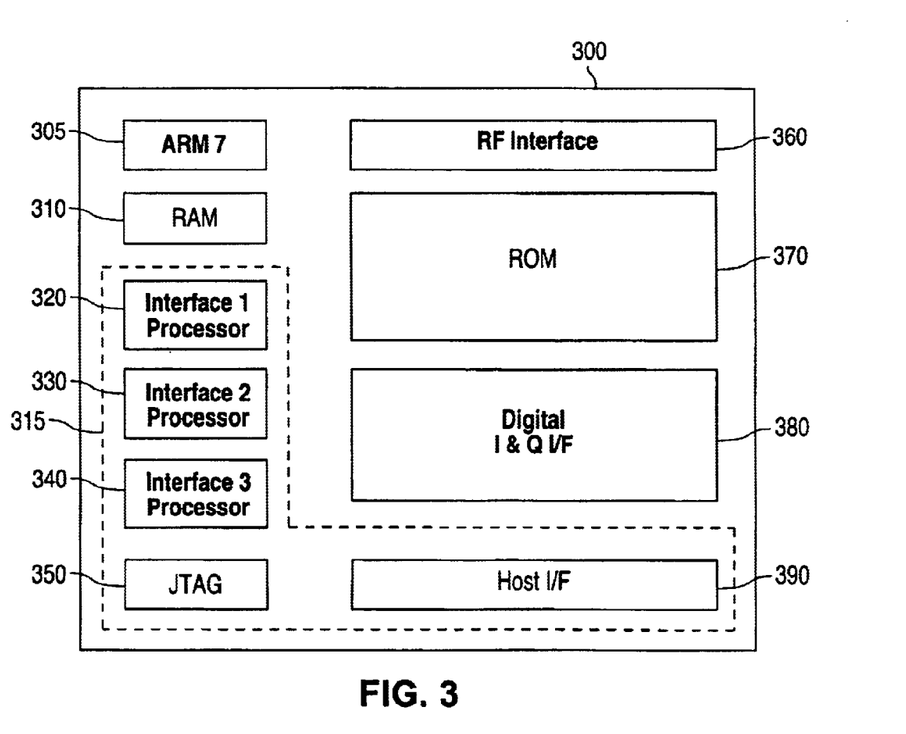
FIG. 3 shows a chip layout for the Modem of FIG. 2A.

Modem 225 of FIG. 2A is preferably implemented as an integrated circuit chip. FIG. 3 shows a chip layout 300 for Modem 225 of FIG. 2A. Chip 300 comprises an ARM 7 305, an RF Interface 360; a RAM 310, a ROM 370; a Digital I&Q I/F 380; and a DSP Core 315 that includes an Interface 1 Processor 320, an Interface 2 Processor 330, an Interface 3 Processor 340, a JTAG 350 and a Host I/F 390.

During operation of modem 225, Computer CPU 215 controls the process whereby modem 225 is configured to operate according to a selected mode of operation, i.e., a change in the telecommunications standard. The applicable reconfiguration software is stored in FLASH memory 265 and can be downloaded by host Computer CPU 215. Similarly, DSP code is stored in FLASH memory 265 and can be downloaded to programmable DSP processor 240. Alternatively, the DSP software and the protocol stack software can be stored in Computer Hard Disk 220 or in Internet Server 275.

Figure 4:
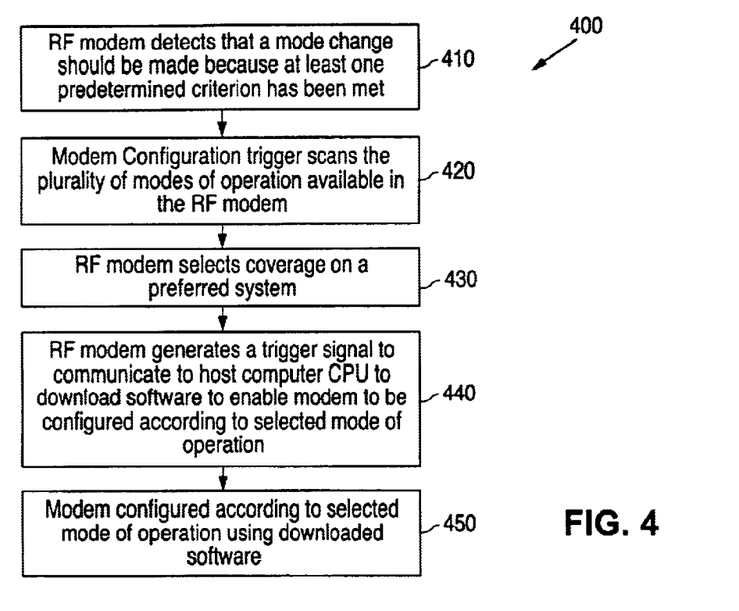
FIG. 4 is a flow diagram illustrating a method according to one embodiment of the present invention for configuring an RF modem to operate according to an alternative mode of operation.

FIG. 4 is a flow diagram illustrating a method 400 according to one embodiment of the present invention for configuring an RF modem to operate according to an alternate mode of operation. At step 410, the RF modem detects that a modem mode change should be made based upon whether at least one predetermined criterion has been met. The Modem Configuration Trigger then scans a predetermined plurality of modes of operation of the RF modem, such as scanning for the coverage availability on other systems, to select a system in accordance with the one or more criterion having been met at step 420. When the modem selects one of said modes of operation at step 430, such as coverage on a preferred system, the modem generates a trigger signal that is communicated to the host computer CPU to identify to the host computing device the identity of the mode of operation selected by the Modem Configuration Trigger at step 440. The host computing device responds to the trigger signal by downloading software to enable the modem to be configured according to the selected mode of operation. Finally, at step 450, the modem's CPU uses the downloaded software to configure the modem according to the selected mode of operation.

Figure 5:
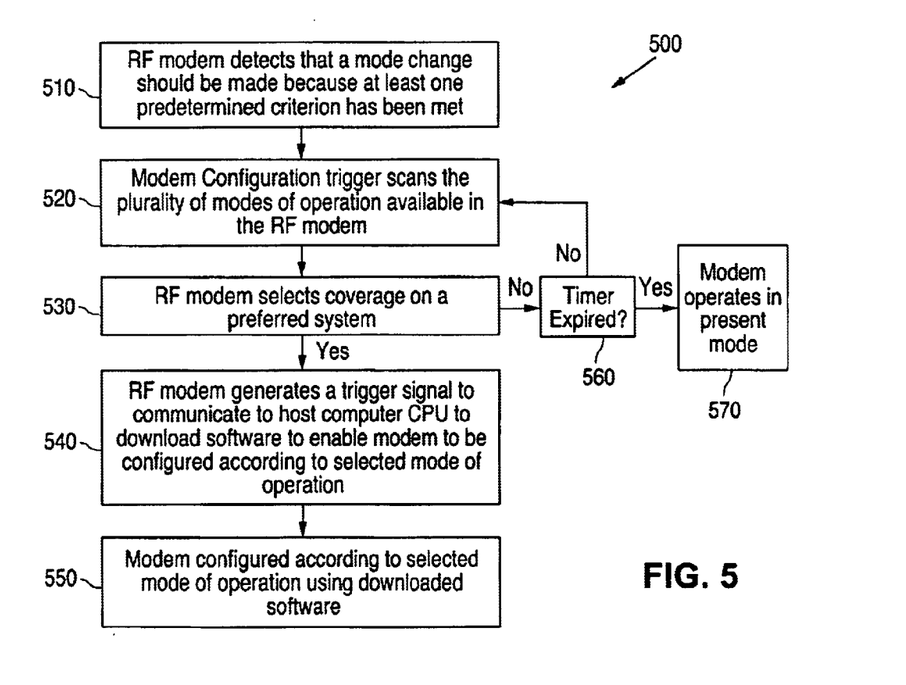
FIG. 5 is a flow diagram illustrating a method according to another embodiment of the present invention for configuring an RF modem to operate according to an alternative mode of operation.

FIG. 5 is a flow diagram illustrating a method 500 according to another embodiment of the present invention for configuring an RF modem to operate according to an alternate mode of operation. This method is identical to the method illustrated in FIG. 4, except that a timer is used to limit the amount of time that the modem scans for a preferred mode of operation. At step 500, the RF modem detects that a modem mode change should be made based upon whether one or more predetermined criterion has been met. The Modem Configuration Trigger then sets a timer and scans a predetermined plurality of modes of operation of the RF modem at step 520, such as scanning for the coverage availability on other systems in accordance with the one or more criterion having been met. If the modem fails to select one of said modes of operation at step 530, such as coverage on a preferred system, before the timer expires at step 560, then the modem continues to operate according to its present mode, at step 570. If the modem selects one of said modes of operation at step 530, such as coverage on a preferred system, the modem generates a trigger signal that is communicated to the host computer CPU to identify to the host computing device the identify of the mode of operation selected by the Modem Configuration Trigger at step 540. The host computing device responds to the trigger signal by downloading software to enable the modem to be configured according to the selected mode of operation. Finally, at step 550, the modem's CPU uses the downloaded software to configure the modem according to the selected mode of operation.

To facilitate proper scanning for an alternative mode or system of operation, the modem has to scan for different systems although the modem is not configured to decode those systems. This can be done in several ways. For instance, the modem may just tune to the already known frequency of the system subject to scanning and perform a simple received signal strength ("RSSI") measurement. If the measured RSSI for that specific frequency is above a certain threshold, the modem can assume that there is coverage on that system. Another alternative is to have the modem implement a detector having necessary hardware and software to detect a certain list of systems. For example, a simple detector of a CDMA pilot channel or a GSM synch channel can be hard coded into the modem using dedicated hardware and software to detect the pilot or synch channel.

Figure 6:
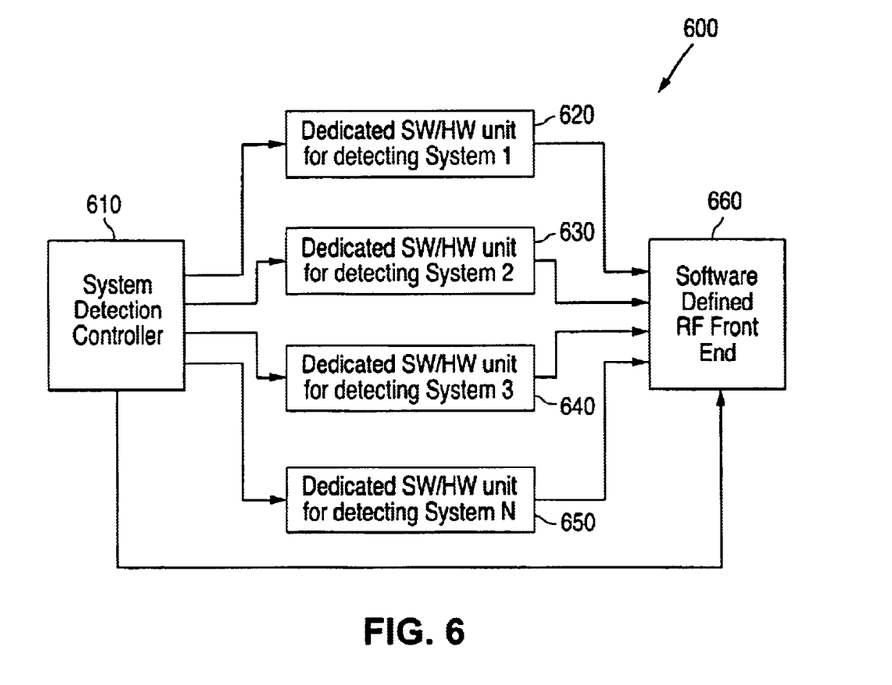
FIG. 6 is a block diagram illustrating a system detector implementation according to one embodiment of the present invention.

FIG. 6 is a block diagram illustrating a system detector implementation according to one embodiment of the present invention. A system detector controller 610 is coupled to and used to control dedicated hardware and software ("SW/HW") units 1 through N, illustrated as blocks 620, 630, 640 and 650, which are used to detect the presence of a control or a sync signal for 1 through N different systems. Each SW/HW unit is used to detect a separate and alternative system. System Detector Controller 610 and SW/HW units 1 through N are coupled to the modem's RF front end 660. Controller 610 can be implemented in software as part of the modem's CPU, and the SW/HW units can be implemented in a separate ASIC or can be implemented in the modem's digital signal processor. As such, the detector is constantly present in the modem to perform system detection.

According to another embodiment of the present invention, the RF modem configuration trigger is external to the modem. For example, the trigger signal may be generated by the user of the host computing device under the control of software resident in the host, thereby causing the desired change in the mode of operation of the modem. Another example would be to couple the trigger signal from a source external to both the host and the modem, e.g., via the internet.

Figure 7:
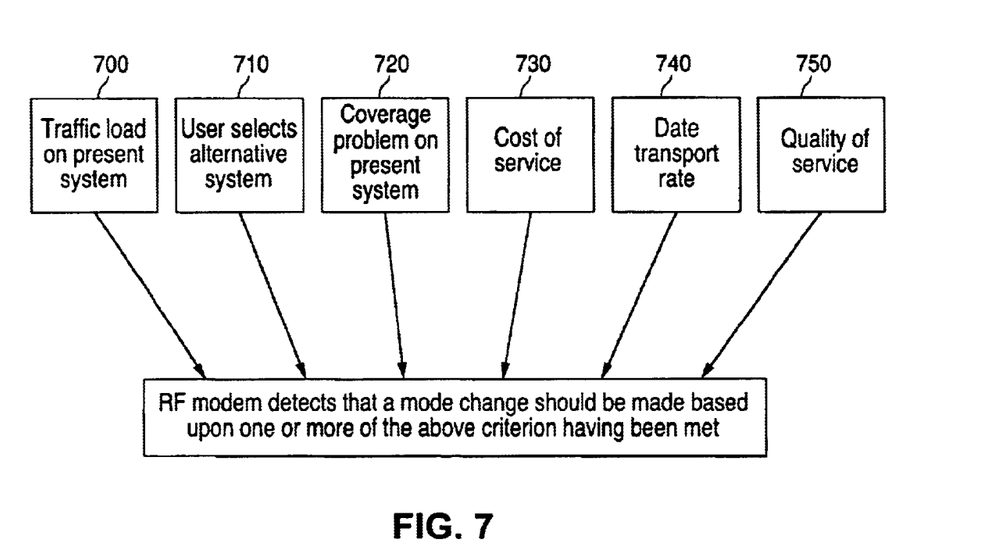
FIG. 7 illustrates a plurality of criterion that, when met or detected, could provide the basis for reconfiguring the RF modem to operate according to an alternative mode of operation.

FIG. 7 illustrates a plurality of criterion that, when met or detected, could provide the basis for reconfiguring the modem to operate according to an alternative mode of operation. Detection of these criteria could occur either internally or externally to the modem. As FIG. 7 indicates, a request for a modem mode change could be triggered because the modem or the host computer detected that one or more of the following criteria were met: (1) criterion 700, a traffic load above a specified threshold; (2) criterion 710, a user request; (3) criterion 720, a coverage problem on the system currently in use; (4) criterion 730, a financial incentive that could be advertised to the user or automatically set as a preference, i.e., the user could set up the modem to automatically switch to the least expensive system available; (5) criterion 740, a desire by the user to always be connected to the highest data rate network; and (6) criterion 750, a desire by the user to be connected to the system with the best Quality of Service ("QOS").

Figure 8:
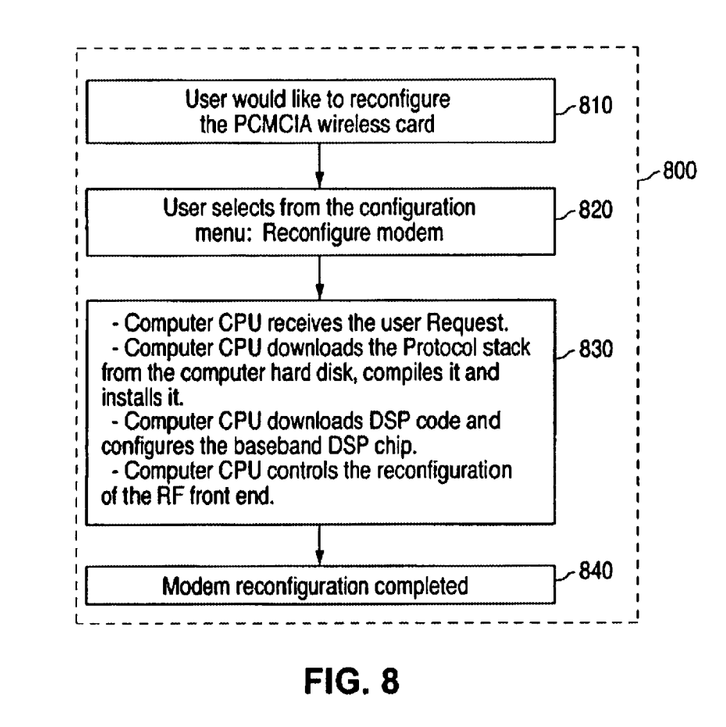
FIG. 8 is a flow diagram illustrating a method according to another embodiment of the present invention for configuring an RF modem to operate according to an alternative mode of operation, wherein the mode change is pursuant to a user's request.

FIG. 8 is a flow diagram illustrating a method 800 according to another embodiment of the present invention for configuring an RF modem to operate according to an alternative mode of operation, wherein the mode change is pursuant to a user's manual request. At step 810, a user indicates he or she would like to reconfigure the modem to operate, for example, according to a preferred wireless standard. At step 820, the user selects from a configuration menu a preferred frequency band. Upon receiving the request at step 830, the host computer CPU downloads from a storage unit the appropriate protocol stack, and installs it in the modem with the help of the modem's CPU; downloads from the storage unit the DSP code and configures the baseband DSP chip with the help of the modem's CPU; and downloads from the storage unit software to configure the wireless modem RF front end hardware, including software for the direct conversion stage and software for the amplifier, and sends this software to the modem CPU to reconfigure the RF front end. At step 840, the modem configuration is complete, and the modem is now operational to function according to the selected alternative mode of operation.

Figure 9:
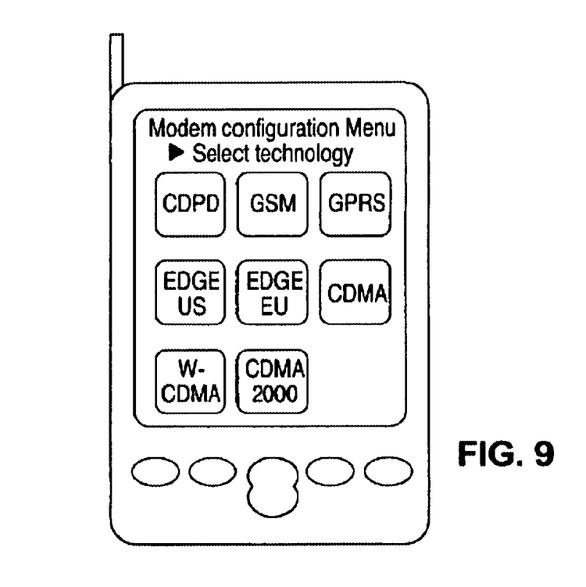
FIG. 9 illustrates a display of a wireless PDA showing several icons from which a user can select to automatically reconfigure the software configurable RF modem according to the present invention.
Figure 10:
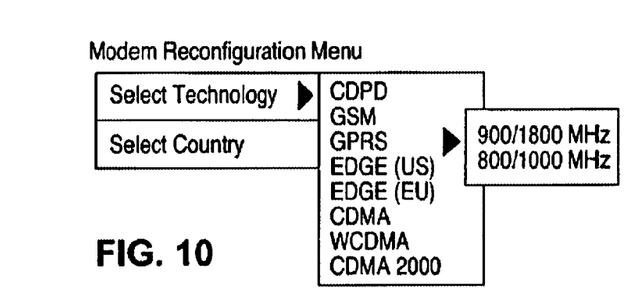
FIG. 10 illustrates a display of a computer, such as a laptop, showing a menu from which a user can select to automatically reconfigure the software configurable RF modem according to the present invention.

FIG. 9 illustrates a display of a wireless PDA showing several icons from which a user can select to automatically reconfigure the software configurable modem. FIG. 10 illustrates a display of a computer, such as a laptop, showing a menu from which a user can choose to automatically reconfigure the modem.

Figure 11:
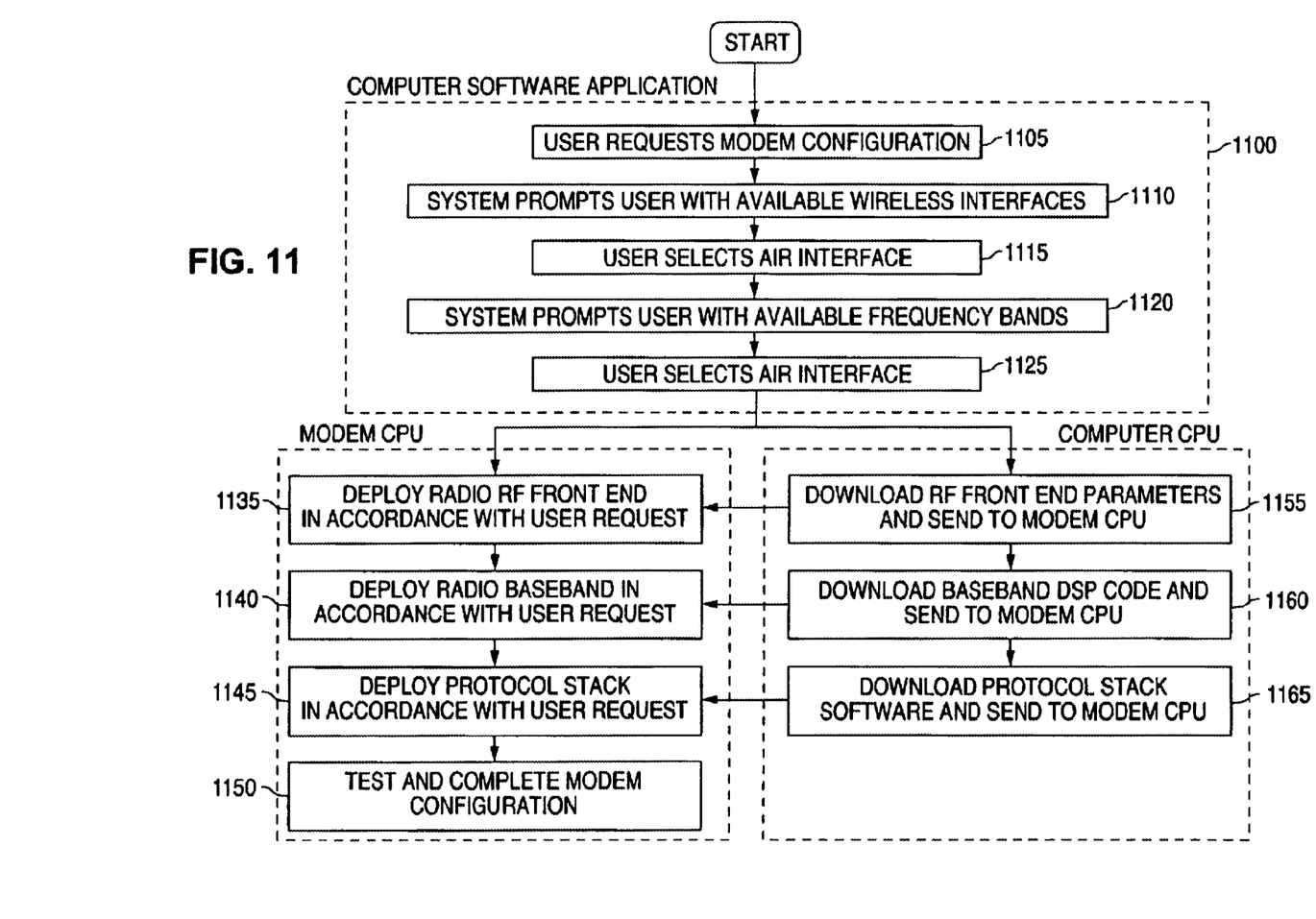
FIG. 11 is a flow diagram illustrating a method according to another embodiment of the present invention for configuring an RF modem to operate according to an alternative mode of operation, wherein the mode change is pursuant to a user's request.

FIG. 11 is a flow diagram illustrating a method 1100 according to another embodiment of the present invention for configuring an RF modem to operate according to an alternative mode of operation, wherein the mode change is pursuant to a user's request. In this method, the modem CPU configures all of its own software configurable components using the software downloaded by the host computer's CPU and sent to the modem CPU.

At step 1105, the user requests a modem reconfiguration. At step 1110, the modem and host computer ("modem/host") system prompts the user with the available wireless air interfaces. The user selects an air interface at step 1120. The modem/host system then prompts the user, at step 1120, with the available frequency bands. The user selects a frequency band at step 1125. The host computer CPU downloads software to send to the modem CPU to configure the RF front end, the baseband processor, and the modem CPU in accordance with the user's request, at step 1155, 1160 and 1165. The modem's CPU then deploys the RF front end, the baseband processor and the protocol stack in accordance with the user's request, at steps 1135, 1140 and 1145. Finally, at step 1150, the modem's CPU tests the modem's operation and completes any additional reconfiguration steps.

Figure 12:
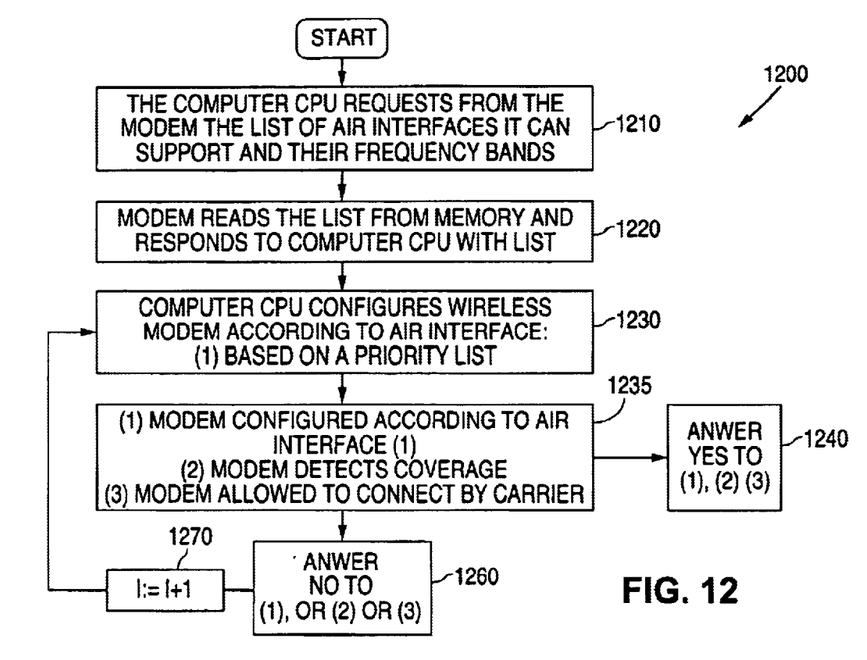
FIG. 12 is a flow diagram illustrating a method according to another embodiment of the present invention for configuring an RF modem to operate according to an alternative mode of operation, wherein the mode change is based on a modem generated list of compatible modes of operation; and, FIG. 13 is a flow diagram illustrating a method according to another embodiment of the present invention for configuring an RF modem to operate according to an alternative mode of operation, wherein the mode change is based upon the location of the wireless modem.

FIG. 12 is a flow diagram illustrating a method 1200 according to another embodiment of the present invention for configuring an RF modem to operate according to an alternative mode of operation, wherein the mode change is based on a modem generated list of compatible modes of operation. First the computer requests, at step 1210, from the wireless modem the type of air interfaces it is capable of supporting as well as the frequency bands its hardware can support and whether it has any restrictions regarding the use of a given carrier. Preferably this information is be stored in a reserved memory space within the wireless modem and can be accessed remotely. However, an SIM card may also be used for this purpose. The modem reads a list of air interfaces and frequency bands from its memory and sends this list to the host computer CPU, at step 1220.

At step 1230, once the host computer receives the information about the modem capabilities, it initiates an algorithm to configure the modem according to the first system on a predetermined priority list of standards. From this preferred list of standards the computer CPU attempts to configure the wireless modem going through an entire configuration cycle for each selected standard at steps 1235, 1260 and 1270. The preferred list of standards may be compiled based on coverage, cost, carrier support, data rate etc. Steps 1230, 1235, 1260 and 1270 are repeated until successful modem configuration is attained at step 1240.

Figure 13:
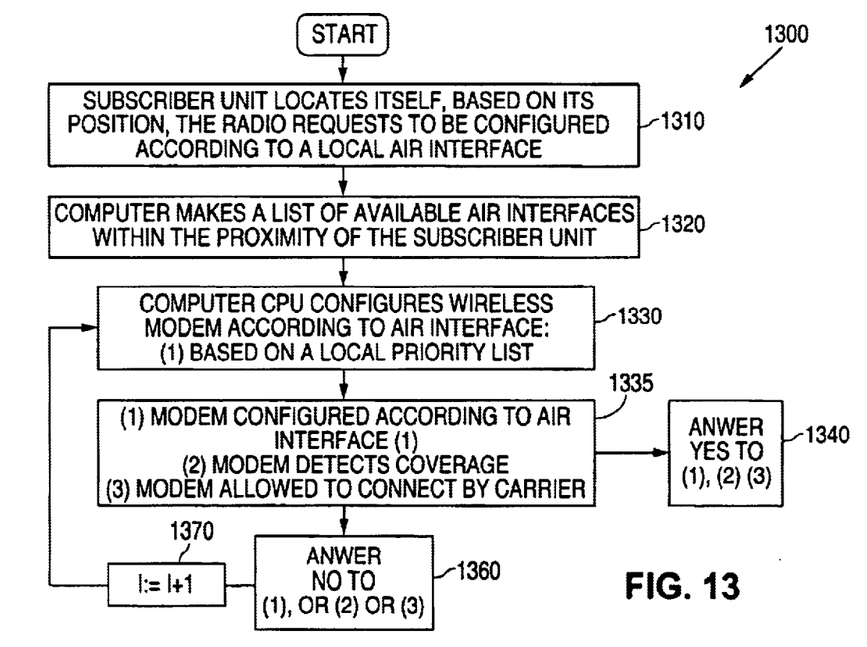

FIG. 13 is a flow diagram illustrating a method 1300 according to another embodiment of the present invention for configuring an RF modem to operate according to an alternative mode of operation, wherein the mode change is based upon the location of the wireless modem. The geographic positioning unit enables the RF modem to be reconfigured using method 1300. Three different implementations can be used. In Implementation 1, the wireless modem sends its location to an infrastructure server and requests a list of technologies and frequency bands that are supported within its proximity. The modem/host ("subscriber") unit selects a mode of operation based on the received list. The preferred system may be the one that has best cost, coverage, data rate, or conservation of battery life.

In Implementation 2, the wireless modem has a geographic database that includes the list of locations, the coverage per location, the carrier per location, and the cost and data rate per location. The wireless modem may select the best available standard and automatically configure itself using software downloaded by the host computer, or the modem may ask the host computer to perform the configuration according to the preferred mode. Alternatively, the modem may prompt the user to make a decision about what standard to use based on the location of the end user.

Finally, Implementation 3 is similar to implementation 2 except that the geographic database is located in the host computer's storage unit. For each of the three implementations, the actual modem configuration based upon the software downloaded by the host computer CPU can be controlled either by the computer CPU ("push configuration") or by the modem CPU ("pull configuration").

Referring again to FIG. 13, at step 1310, the modem/host unit locates itself and based upon its position requests to be configured according to a local air interface. The host computer, at step 1320, compiles a list of available air interfaces within the proximity of the modem/host unit. At step 1330, once the host computer receives the information about the modem capabilities, it initiates an algorithm to configure the modem according to the first system on a predetermined priority list of standards. From this preferred list of standards the computer CPU attempts to configure the wireless modem going through an entire configuration cycle for each selected standard at step 1335, 1360 and 1370. The preferred list of standards may be compiled based on coverage, cost, carrier support, data rate, etc. Steps 1330, 1335, 1360 and 1370 are repeated until successful modem configuration is attained at step 1340.

The embodiments of the method and apparatus for a software configurable wireless modem adaptable for multiple modes of operation described above are illustrative of the principles of the present invention and are not intended to limit the invention to the particular embodiments described. Other embodiments of the present invention can be adapted for use in any RF wireless environment. For instance those skilled in the art will recognize that the methods and apparatus described herein may be used with RF modems and host computers having different architectures, i.e. systems with a distributed architecture wherein the modem and host computer for instance share a CPU or memory. Accordingly, while the preferred embodiment of the invention has been illustrated and described, it will be appreciated that various changes can be made therein without departing from the spirit and scope of the invention.

What is claimed is:

1. A detachable software configurable wireless radio frequency ("RF") modem for facilitating wireless data communications according to a plurality of modes of operation, said RF modem constructed to plug into a host computing device having a storage unit and a central processing unit ("CPU") operative to download software into said RF modem in response to a trigger signal generated by said RF modem, to enable said RF modem to change from a present mode of operation to a selected alternate mode of operation, said RF modem comprising:

an antenna for receiving or transmitting an electromagnetic RF signal;

a software configurable RF front end coupled to said antenna for performing RF conversion;

a software configurable baseband processor coupled to said RF front end for performing baseband processing;

a software configurable modem CPU coupled to said baseband processor and said RF front end for performing protocol stack control and for facilitating said RF modem mode change; and a modem reconfiguration trigger for detecting that at least one predetermined criterion has been met and for generating said trigger signal in response thereto that identifies said selected alternate mode of RF modem operation, said modem CPU operating in response to said downloaded software to reconfigure said RF front end, said baseband processor and said modem CPU so as to cause said RF modem to operate according to said selected alternate mode of operation.

2. The RF modem of claim 1, wherein said modem configuration trigger comprises a system detector for scanning a predetermined plurality of modes of RF modem operation and for selecting one of said modes of operation based on the at least one predetermined criterion that has been met.

3. The RF modem of claim 2, wherein said system detector scans said predetermined modes of operation and performs at least one received signal strength indicator measurement in each said mode.

4. The RF modem of claim 2, wherein said system detector scans said predetermined modes of operation by detecting the presence of at least one control signal or synch channel that corresponds to a given mode of operation.

5. The RF modem of claim 4, wherein said system detector comprises at least one detection unit and a system detection controller that controls each said detection unit, wherein each said detection unit is coupled to said RF front end and is operative to detect the presence of a given said control signal or synch channel.

6. The RF modem of claim 5, wherein said system detection controller comprises a software program executed by said modem CPU.

7. The RF modem of claim 5, wherein said baseband processor includes each said detection unit.

8. The RF modem of claim 1, wherein one said predetermined criterion is a modem user's request for said mode change.

9. The RF modem of claim 1, wherein one said predetermined criterion is traffic load on said present mode of operation above a specified threshold.

10. The RF modem of claim 1, wherein one said predetermined criterion is coverage reliability on said present mode of operation.

11. The RF modem of claim 1, wherein one said predetermined criterion is cost of service.

12. The RF modem of claim 1, wherein one said predetermined criterion is quality of service.

13. The RF modem of claim 1, wherein one said predetermined criterion is data transport rate.

14. The RF modem of claim 1, further comprising a geographic positioning device coupled to said modem CPU for determining the geographic location of said RF modem.

15. The RF modem of claim 14, wherein one said predetermined criterion is said geographic location of said RF modem.

16. A detachable software configurable wireless radio frequency ("RF") modem for facilitating wireless data communications according to a plurality of modes of operation, said RF modem constructed to plug into a host computing device having a storage unit and a central processing unit ("CPU") operative to download software into said RF modem in response to a trigger signal generated by said RF modem, to enable said RF modem to change from a present mode of operation to a selected alternate mode of operation, said RF modem comprising:

an antenna for receiving or transmitting an electromagnetic RF signal;

a software configurable RF front end coupled to said antenna for performing RF conversion;

a software configurable baseband processor coupled to said RF front end for performing baseband processing;

a software configurable modem CPU coupled to said baseband processor and said RF front end for performing protocol stack control and for facilitating said RF modem mode change;

a modem reconfiguration trigger for detecting that at least one predetermined criterion has been met and for generating said trigger signal in response thereto that identifies said selected alternate mode of RF modem operation; and a geographic positioning device coupled to said modem CPU for determining the geographic location of said RF modem, said modem CPU operating in response to said downloaded software to reconfigure said RF front end, said baseband processor and said modem CPU so as to cause said RF modem to operate according to said selected alternate mode of operation.

17. A method for generating a mode change in a detachable and software configurable wireless radio frequency ("RF") modem from a present mode of operation to a selected alternate mode of operation, said RF modem having an antenna, a software configurable RF front end, a software configurable baseband processor, and a software configurable central processing unit ("CPU") for providing wireless data communications according to a selected one of a plurality of modes of operation, said RF modem constructed to plug into a host computing device having a storage unit and a CPU, said host computing device operative to download software into said modem in response to a trigger signal generated by said RF modem, to enable said RF modem to change its mode of operation, said method comprising the steps of:

(a) detecting whether at least one predetermined criterion has been met;

(b) scanning a predetermined plurality of RF modem modes of operation to determine one or more modes of operation that satisfy said at least one predetermined criterion;

(c) selecting a mode of operation from said one or more modes of operation determined in step (b);

(d) generating said trigger signal to identify to said host computing device the identity of the mode of operation selected in step (c); and (e) configuring said RF modem using the software downloaded from said host computing device to cause said RF modem to operate according to said mode of operation selected in step (c).

18. The method of claim 17 wherein said RF modem is caused to search for an alternate mode of operation only upon the occurrence of a predetermined event, and wherein step (b) further comprises the setting of a timer, such that, when the timer expires, the RF modem is caused to cease scanning for a mode of operation that satisfies said at least one predetermined criterion, said RF modem thereafter continuing to operate according to said present mode of operation.

19. The method of claim 17, wherein one said predetermined criterion is a modem user's request for said mode change.

20. The method of claim 17, wherein one said predetermined criterion is traffic load on said present mode of operation above a specified threshold.

21. The method of claim 17, wherein one said predetermined criterion is coverage reliability on said present mode of operation.

22. The method of claim 17, wherein one said predetermined criterion is cost of service.

23. The method of claim 17, wherein one said predetermined criterion is quality of service.

24. The method of claim 17, wherein one said predetermined criterion is data transport rate.

25. The method of claim 17, wherein one said predetermined criterion is the geographic location of said RF modem.

26. A method for generating a mode change in a detachable and software configurable wireless radio frequency ("RF") modem from a present mode of operation to a selected alternate mode of operation, said RF modem having an antenna, a software configurable RF front end, a software configurable baseband processor, and a software configurable central processing unit ("CPU") for providing wireless data communications according to a selected one of a plurality of modes of operation, said RF modem constructed to plug into a host computing device having a storage unit and a CPU, said host computing device operative to download software into said modem in response to a trigger signal generated by said RF modem, to enable said RF modem to change its mode of operation, said method comprising the steps of:

(a) detecting a request from a user of said RF modem to change said RF modem's mode of operation;

(b) providing the user with a list of available alternate modes of operation and enabling the user to select a desired alternative mode of operation;

(c) downloading from said host computing device software to enable said RF modem to be configured according to said selected alternative mode of operation; and (d) configuring said RF modem using said downloaded software to operate according to said selected alternative mode of operation.

27. The method of claim 26, wherein step (d) includes the step of configuring said modem CPU, said baseband processor and said RF head.

28. A method for generating a mode change in a detachable and software configurable wireless radio frequency ("RF") modem from a present mode of operation to a selected alternate mode of operation, said RF modem having an antenna, a software configurable RF front end, a software configurable baseband processor, and a software configurable central processing unit ("CPU") for providing wireless data communications according to a selected one of a plurality of modes of operation, said RF modem constructed to plug into a host computing device having a storage unit and a CPU, said host computing device operative to download software into said modem in response to a trigger signal generated by said RF modem, to enable said RF modem to change its mode of operation, said method comprising the steps of:

(a) requesting from said modem by said host computing device a list of said plurality of modes of operation;

(b) supplying by said modem to said host computing device said list requested in step (a);

(c) configuring said modem according to a first mode of operation on said list supplied in step (b);

(d) determining if said modem operates according to said mode of operation and if not configuring said modem according to a next mode of operation on said list supplied in step (b) and repeating step (d); and (e) operating said modem.

29. A method for generating a mode change in a detachable and software configurable wireless radio frequency ("RF") modem from a present mode of operation to a selected alternate mode of operation, said RF modem having an antenna, a software configurable RF front end, a software configurable baseband processor, and a software configurable central processing unit ("CPU") for providing wireless data communications according to a selected one of a plurality of modes of operation, said RF modem constructed to plug into a host computing device having a storage unit and a CPU, said host computing device operative to download software into said modem in response to a trigger signal generated by said RF modem, to enable said RF modem to change its mode of operation, said method comprising the steps of:

(a) determining the geographic location of said modem;

(b) requesting by said modem to said host computing device to be configured according to a mode of operation that is operational within said geographic location of said modem;

(c) generating by said host computing device a list of at least one said mode of operation that is operational within said geographic location of said modem;

(d) configuring said modem according to a first mode on said list generated in step (c);

(e) determining if said modem operates according to said mode of operation and if not configuring said modem according to a next mode of operation on said list generated in step (c) and repeating step (e); and (f) operating said modem.

30. The method of claim 29, wherein said list generated in step (c) is generated from a geographic database stored in said RF modem.

31. The method of claim 29, wherein said list generated in step (c) is generated from a geographic database stored in said host computing device.

32. The method of claim 29, wherein steps (d) and (e) are performed by said RF modem.

33. The method of claim 29, wherein steps (d) and (e) are performed by said host computing device.

34. A detachable software configurable wireless radio frequency ("RF") modem for facilitating wireless data communications according to a plurality of modes of operation, said RF modem constructed to plug into a host computing device having a storage unit and a central processing unit ("CPU") operative to download software into said RF modem in response to a trigger signal generated external to said RF modem, to enable said RF modem to change from a present mode of operation to a selected alternate mode of operation, said RF modem comprising:

an antenna for receiving or transmitting an electromagnetic RF signal;

a software configurable RF front end coupled to said antenna for performing RF conversion;

a software configurable baseband processor coupled to said RF front end for performing baseband processing; and, a software configurable modem CPU coupled to said baseband processor and said RF front end for performing protocol stack control and for facilitating said RF modem mode change, said modem CPU operating in response to said downloaded software to reconfigure said RF front end, said baseband processor and said modem CPU so as to cause said RF modem to operate according to said selected alternate mode of operation.

35. The RF modem of claim 34, wherein said trigger signal is generated by a software program stored in said storage unit in response to a user's request.

36. The RF modem of claim 34, wherein said trigger signal is generated by a server internet.

37. A method for generating a mode change in a detachable and software configurable wireless radio frequency ("RF") modem from a present mode of operation to a selected alternate mode of operation, said RF modem having an antenna, a software configurable RF front end, a software configurable baseband processor, and a software configurable central processing unit ("CPU") for providing wireless data communications according to a selected one of a plurality of modes of operation, said RF modem constructed to plug into a host computing device having a storage unit and a CPU, said host computing device operative to download software into said modem in response to a trigger signal generated external to said RF modem, to enable said RF modem to change its mode of operation, said method comprising the steps of:

(a) detecting whether at least one predetermined criterion has been met;

(b) scanning a predetermined plurality of RF modem modes of operation to determine one or more modes of operation that satisfy said at least one predetermined criterion;

(c) selecting a mode of operation from said one or more modes of operation determined in step (b);

(d) generating said trigger signal to identify to said host computing device the identity of the mode of operation selected in step (c); and (e) configuring said RF modem using the software downloaded from said host computing device to cause said RF modem to operate according to said mode of operation selected in step (c).

38. The method of claim 37, wherein said trigger signal is generated by a software program stored in said storage unit in response to a user's request.

39. The method of claim 37, wherein said trigger signal is generated by a server internet.

* * * * *